United States Patent
Chakraborty et al.

(10) Patent No.: US 12,255,728 B2
(45) Date of Patent: Mar. 18, 2025

(54) SPECTRUM MANAGEMENT FOR SATELLITE CONSTELLATIONS

(71) Applicant: Microsoft Technology Licensing, LLC, Redmond, WA (US)

(72) Inventors: Tusher Chakraborty, Bangalore (IN); Ranveer Chandra, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 272 days.

(21) Appl. No.: 17/714,890

(22) Filed: Apr. 6, 2022

(65) Prior Publication Data
US 2023/0179287 A1 Jun. 8, 2023

(30) Foreign Application Priority Data
Dec. 8, 2021 (IN) .............................. 202141057106

(51) Int. Cl.
*H04B 7/185* (2006.01)
*H04W 16/04* (2009.01)
*H04W 16/10* (2009.01)

(52) U.S. Cl.
CPC ........ *H04B 7/18513* (2013.01); *H04W 16/04* (2013.01); *H04W 16/10* (2013.01)

(58) Field of Classification Search
CPC ............ H04B 7/18513; H04B 7/18519; H04B 7/18539; H04B 7/2041; H04W 16/04; H04W 16/10
See application file for complete search history.

(56) References Cited

U.S. PATENT DOCUMENTS

| 5,448,621 | A | * | 9/1995 | Knudsen | ............... | H04W 16/06 |
| | | | | | | 455/12.1 |
| 5,832,379 | A | * | 11/1998 | Mallinckrodt | ........ | H04L 1/0047 |
| | | | | | | 455/12.1 |

(Continued)

FOREIGN PATENT DOCUMENTS

| KR | 102037049 B1 | * | 3/2019 | |
| WO | WO-2023041172 A1 | * | 3/2023 | ........... H04L 5/0053 |

OTHER PUBLICATIONS

Oltjon Kodheli et al.: "NB-IoT via LEO Satellites: An Efficient Resource Allocation Strategy for Uplink Data Transmission", IEEE Internet of Things Journal, vol. 9, No. 7, Jul. 2, 2021, pp. 5094-5107 (Year: 2021).*

Jia Haoge et al.: "Uplink Interference and Performance Analysis for Megasatellite Constellation", IEEE Internet of Things Journal, IEEE, vol. 9, No. 6, Aug. 11, 2021, pp. 4318-4329 (Year: 2021).*

(Continued)

*Primary Examiner* — Yuwen Pan
*Assistant Examiner* — Swati Jain
(74) *Attorney, Agent, or Firm* — Barta Jones, PLLC

(57) ABSTRACT

A device and method for managing communication frequencies, including generating a geographical grid with a plurality of cells and allocating communication frequencies to the cells. Each of the communication frequencies is used for communication between a satellite and a ground device or ground IoT modem. A communication frequency allocated to one cell is different from the communication frequencies allocated to each of the immediately surrounding cells. A set of communication frequencies is selected for communication between the satellite and ground devices based on a ground track of the satellite. The selected set is transmitted to the satellite to communicate with the ground station located in a cell with the communication frequency allocated to that cell.

20 Claims, 11 Drawing Sheets

(56) References Cited

U.S. PATENT DOCUMENTS

| | | | | |
|---|---|---|---|---|
| 6,166,687 | A * | 12/2000 | Ishikawa | G01S 5/12 342/357.2 |
| 6,714,780 | B1 * | 3/2004 | Antonio | H04B 7/18541 370/332 |
| 7,831,251 | B2 * | 11/2010 | Karabinis | H04W 16/14 455/448 |
| 2003/0050008 | A1 * | 3/2003 | Patterson | H04B 7/18578 455/12.1 |
| 2010/0045520 | A1 * | 2/2010 | Pitt | G01S 19/05 342/357.42 |
| 2020/0052782 | A1 * | 2/2020 | Wang | H04W 76/27 |
| 2021/0036768 | A1 * | 2/2021 | Keshet | H04B 7/212 |
| 2021/0044371 | A1 * | 2/2021 | Chen | H04J 13/0003 |
| 2022/0007372 | A1 * | 1/2022 | Ma | H04L 5/006 |
| 2022/0416883 | A1 * | 12/2022 | Geng | H04B 7/18513 |
| 2023/0014581 | A1 * | 1/2023 | Yu | H04W 56/005 |
| 2023/0189315 | A1 * | 6/2023 | Haustein | H04W 24/02 370/252 |
| 2023/0344511 | A1 * | 10/2023 | Choinière | H04B 7/18539 |

OTHER PUBLICATIONS

"3rd Generation Partnership Project; Technical Specification Group Radio Access Network; Solutions for NR to support non-terrestrial networks (NTN) (Release 16)", 3GPP TR 38.821, vol. RAN WG3, No. V1 .0.0 Dec. 2, 2019 (Dec. 2, 2019), pp. 1-143, XP051840691, (Year: 2019).*

"3rd Generation Partnership Project; Technical Specification Group Radio Access Network; Solutions for NR to support non-terrestrial networks (NTN) (Release 16)", In Technical Report 3GPP TR 38.821, vol. RAN WG3, Issue V1.0.0, Dec. 2, 2019, 143 Pages.

Jia, et al., "Uplink Interference and Performance Analysis for Megasatellite Constellation", In Journal of IEEE Internet of Things, vol. 9, Issue 6, Aug. 11, 2021, pp. 4318-4329.

Kodheli, et al., "NB-IoT via LEO Satellites: An Efficient Resource Allocation Strategy for Uplink Data Transmission", In Repository of arXiv:2107.01067v1, Jul. 2, 2021, 14 Pages.

"International Search Report and Written Opinion Issued in PCT Application No. PCT/US22/049469", Mailed Date: Mar. 20, 2023, 10 Pages.

* cited by examiner

SPECTRUM MANAGEMENT FOR SATELLITE CONSTELLATIONS

CROSS-REFERENCE TO RELATED APPLICATION

This application claims the benefit of India Provisional Patent Application serial number 202141057106, filed on Dec. 8, 2021 and entitled "Spectrum Management for Satellite Constellations", which is hereby incorporated by reference in its entirety for all intents and purposes.

BACKGROUND

Cube and nanosatellite constellations for Internet of Things (IoT) connectivity are considered the future of IoT. These constellations enable IoT devices on the ground to directly communicate with satellites included in the constellation, which overall is referred to as Direct-to-Satellite (DtS) IoT technology. Satellites utilized in DtS-IoT technology are small in size and cost. Because the nanosatellite directly communicates with the IoT devices, the nanosatellite uses narrow bandwidths for communication. A complete constellation of such satellites can offer constant global coverage.

A DtS-IoT satellite constellation has a large application domain in several industries including agriculture, oil and gas, green energy, forestry, supply chain, and more. Accordingly, a DtS-IoT satellite constellation requires capacity to support up to hundreds of thousands IoT devices on the ground. Existing systems lack the capability to support and manage bandwidth for such a large quantity of IoT devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples and implementations disclosed herein are directed to systems and methods that provide management of communication frequencies. An example device for managing communication frequencies includes at least one processor, a transceiver, and a computer-readable medium storing instructions executable by the at least one processor. When the processor executes the instructions, the processor allocates one of a plurality of communication frequencies to each of a plurality of cells, a communication frequency allocated to one cell being different from a communication frequency allocated to each cell neighboring the one cell. The processor further selects, based on a ground track of a satellite, a set of the allocated communication frequencies and transmits data identifying the selected set of the communication frequencies to the satellite. In some examples, the satellite is configured to broadcast a beacon, to a ground device in one of the plurality of cells, identifying a communication frequency from the selected set for the ground device to communicate with the satellite while the satellite has a sub-satellite point in the one of the plurality of cells.

BRIEF DESCRIPTION OF THE DRAWINGS

The present description will be better understood from the following detailed description read in light of the accompanying drawings, wherein:

FIGS. 7A-7C illustrate examples of communication frequency allocation on the micro-cell grid;

FIG. 8 illustrates an example of macro-cells;

Corresponding reference characters indicate corresponding parts throughout the drawings. In FIGS. 1 to 12, the systems are illustrated as schematic drawings. The drawings may not be to scale.

DETAILED DESCRIPTION

Figure 1:
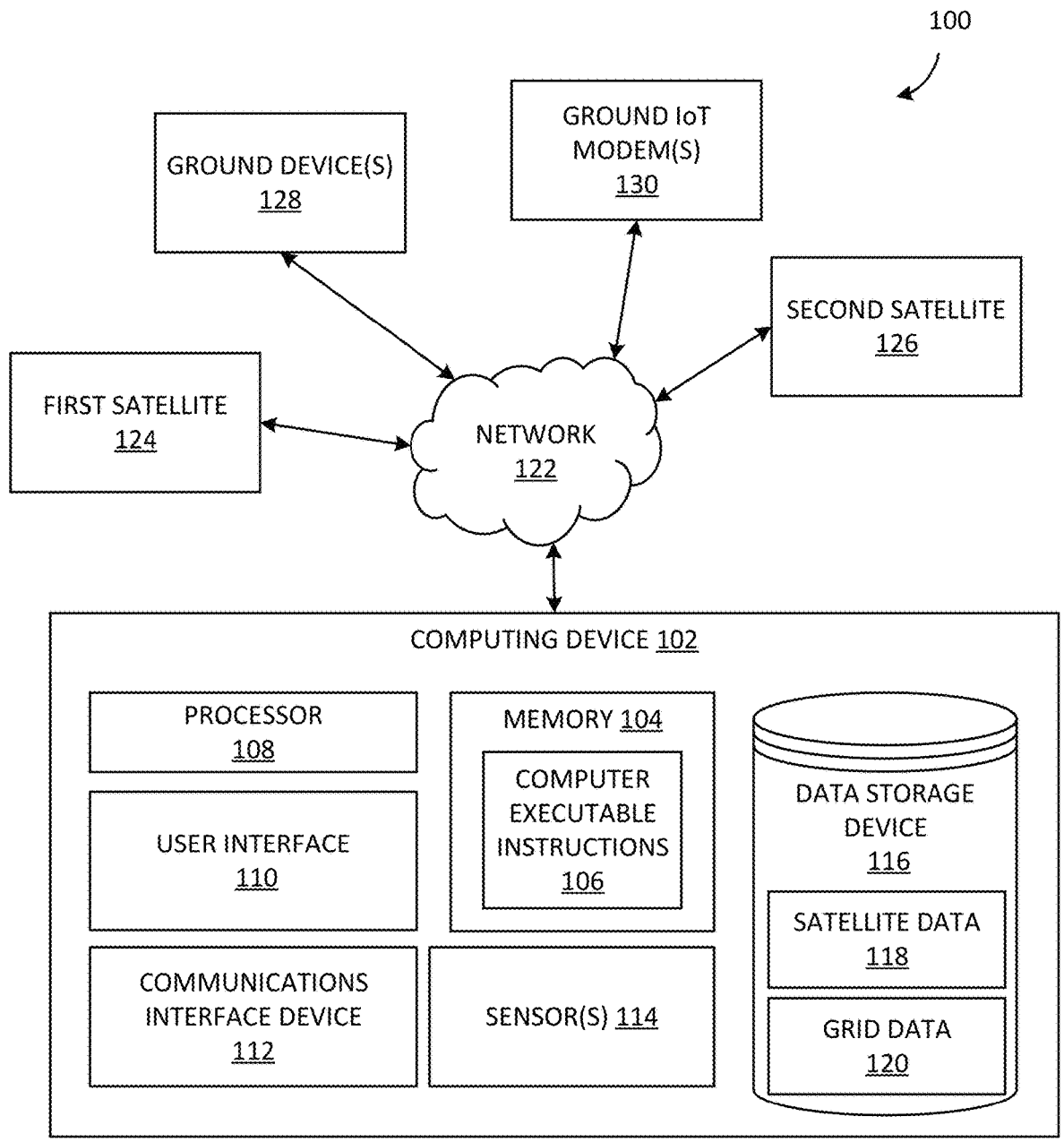
FIG. 1 is a block diagram illustrating an example system for management of a network of communication frequencies for ground devices and satellite constellations.

One approach to increase capacity for a growing quantity of ground stations is to expand the satellite constellation (e.g., add additional satellites to the constellation). However, this approach provides only a brief capacity boost and does not further increase the capacity after the brief capacity boost because of the large footprints of the satellites. Some satellites use omni-directional antennas for narrowband communication. As the number of satellites increases in the constellation, the amount of overlap in the footprints of the satellites also increases. Because all the satellites in the constellation share the same spectrum with some existing systems, the communication links between the ground stations and satellites collide within the overlapped footprints, resulting in throughput loss. As a result, expanding the constellation alone does sufficiently increase the capacity. In broadband satellites, the issue of the large footprint is mitigated using beamforming and directional antennas. However, as the number of constellations increases, the spectrum still becomes crowded.

In contrast with the existing systems, various implementations of the present disclosure recognize and take into account the advantages of increasing overall spectrum use efficiency by enabling spectrum sharing among the constellations. Aspects of the disclosure provide a computerized method and system for location based management of a network of communication frequencies for Internet of Things (IoT) devices and broadband satellite constellations. The system provides a database of communication frequencies organized into a grid that is utilized by ground IoT modems and multiple satellite constellations to select a communication frequency for communication between the IoT modems and the satellites to avoid collisions in communications. Accordingly, the system facilitates collision avoidance among ground IoT modems and other ground devices located in overlapped footprints of the satellites from both the same and different constellations.

As referenced herein, a communication frequency is a frequency, set of frequencies, or a frequency band, within a communication spectrum utilized by satellite service providers for communication with other satellites, a ground receiver, a ground IoT modem, or any other suitable device. Various implementations of the communication frequency include an ultra-high frequency (UHF) band, a very high frequency (VHF) band, an industrial, scientific, and medical (ISM) band, L band, S band, or any other suitable frequency band or channel. In some implementations, the term spectrum refers to a set or range of communication frequencies. Accordingly in some examples, the allocation of a communication frequency, or communication frequencies, refers to the selection, or assignment, of a particular communication frequency to a cell of a grid as described herein. In some implementations described herein, the communication frequency is also referred to as a communication channel, a communication modality, a communication network, and/or a communication protocol.

As referenced herein, the system is operable with any satellite, including a cube or nanosatellite. The satellite may be relatively small, for example less than 10 kilograms (kg). A constellation is a collection of commonly owned and/or operated satellites. For example, a constellation includes one or more satellites that cooperatively provide coverage for and communicate with a group of ground IoT modems, ground receivers, ground stations, or other ground devices. In some implementations, the constellation includes up to 150 or 200 satellites. In some implementations, the satellites use omnidirectional antennas from an altitude above the Earth in orbit, for example between 300 and 500 kilometers (km) above the Earth's surface. Accordingly, the footprint of the satellites on the Earth's surface is large. In other implementations, the satellites use directional, beamforming techniques that create a smaller footprint. In these implementations, more satellites may be used in a constellation to achieve the same coverage.

While the cells are described in some examples in the context of a geographical grid, aspects of the disclosure are operable with any quantity and arrangement of geographically positioned cells. For example, each of the cells may have boundaries defined by geographical coordinates such as latitude and longitude values. Further, the boundaries may be regular shaped (e.g., at least two sides are parallel) or irregular shaped. While some examples describe a cell as having neighboring cells, immediately adjacent cells, or the like, aspects of the disclosure are operable with cells whose boundaries do not touch or overlap each other, but instead may have geographical distance between them. In such an example, a satellite may encounter a series of contiguous or non-contiguous cells arranged along its ground track. A ground track is the path on Earth's surface directly below the satellite's trajectory.

FIG. 1 is a block diagram illustrating a system for management of a network of communication frequencies for ground devices and broadband satellite constellations according to various implementations of the present disclosure. Various implementations of this system can be provided without departing from the scope of the present disclosure. For example, additional elements can be added, various elements can be omitted, and so forth.

The system 100 includes a computing device 102, a network 122, a first satellite 124, a second satellite 126, and a ground device 128. The computing device 102 represents any device executing computer-executable instructions 106 (e.g., as application programs, operating system functionality, or both) to implement the operations and functionality associated with the computing device 102. The computing device 102 in some examples includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 includes at least one processor 108, a memory 104 that includes the computer-executable instructions 106, a user interface device 110, a communications interface device 112, one or more sensor(s) 114, and a data storage device 116. The processor 108 includes any quantity of processing units and is programmed to execute the computer-executable instructions 106. The computer-executable instructions 106 are executed, or performed, by the processor 108, executed by multiple processors within the computing device 102, or executed by a processor external to the computing device 102. In some examples, the processor 108 is programmed to execute computer-executable instructions 106 such as those illustrated in the figures described herein.

The memory 104 includes any quantity of media associated with or accessible by the computing device 102. In some examples, the memory 104 is internal to the computing device 102. In other examples, the memory 104 is external to the computing device 102 or both internal and external to the computing device 102. For example, the memory 104 can include both a memory component internal to the computing device 102 and a memory component external to the computing device 102. The memory 104 stores data, such as one or more applications. The applications, when executed by the processor 108, operate to perform various functions on the computing device 102. The applications can communicate with counterpart applications or services, such as web services accessible via the network 122. In an example, the applications represent downloaded client-side applications that correspond to server-side services executing in a cloud.

The user interface device 110 includes a graphics card for displaying data to a user and receiving data from the user. The user interface device 110 can also include computer-executable instructions, for example a driver, for operating the graphics card. Further, the user interface device 110 can include a display, for example a touch screen display or natural user interface, and/or computer-executable instructions, for example a driver, for operating the display. The user interface device 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in one or more ways.

The computing device 102 further includes a communications interface device 112. The communications interface device 112 includes a network interface card and/or computer-executable instructions, such as a driver, for operating the network interface card. Communication between the computing device 102 and other devices, such as but not limited to the first satellite 124 the second satellite 126, and the ground device 128, can occur using any protocol or mechanism over any wired or wireless connection, such as BLUETOOTH® beacons. In some examples, the communications interface device 112 is operable with short range communication technologies such as by using near-field communication (NFC) tags.

The computing device 102 further includes a data storage device 116 for storing data, such as, but not limited to satellite data 118 and/or grid data 120. The data storage device 116 can include one or more different types of data storage devices, such as, for example, one or more rotating disks drives, one or more solid state drives (SSDs), and/or any other type of data storage device. The data storage device 116 in some non-limiting examples includes a redundant array of independent disks (RAID) array. In other examples, the data storage device 116 includes a database or other structure for storing data. The data storage device 116, in this example, is included within the computing device 102, attached to the computing device 102, plugged into the computing device 102, or otherwise associated with the computing device 102. In other examples, the data storage device 116 includes a remote data storage accessed by the computing device 102 via the network 122, such as a remote data storage device, a data storage in a remote data center, or a cloud storage. In some implementations, the data storage device 116 is included within the memory 104. In other implementations, the data storage device 116 is provided separate from, attached to, or otherwise associated with the memory 104.

The satellite data 118 includes data and information regarding one or more satellites, such as the first satellite 124 and/or the second satellite 126, included in one or more constellations. The satellite data 118 includes orbital patterns (and corresponding ground tracks) of the one or more satellites, speed at which the one or more satellites orbit, location information of the one or more satellites, communications information, and so forth. In some implementations, the processor 108 utilizes the satellite data 118 to generate grid data 120 including the one or more micro-cell grids 600, 602, 701, 703, 705 and/or macro-cells 801, 811 described in greater detail below. For example, the processor 108 uses the satellite data 118 to perform the communication frequency allocation described herein and generate the micro-cell grid 600, 602, 701, 703, 705. In some implementations, the processor 108 further utilizes the generate micro-cell grid 600, 602, 701, 703, 705 to create one or more macro-cells 801, 811.

The grid data 120 is stored in the data storage device 116 to be accessed by one or more constellations to identify allocated communications frequencies for the satellites in the one or more constellations. The grid data 120 includes one or more of the micro-cell grids 600, 602, 701, 703, 705 and the macro-cells 801, 811 described in greater detail below. The processor 108 generates, or creates, a spectrum map that includes selected communication frequencies for all cells which will include a sub-satellite point along the ground track, such as the ground tracks 503 described in greater detail below, of each satellite. For example, the first satellite 124 receives its spectrum map from the ground device 128 and the second satellite 126 receives its spectrum map, different from the spectrum map of the first satellite 124 due to its different ground tracks, from the ground device 128. The satellites use the selected communication frequencies for each respective cell during orbit for communication with respective ground IoT modems 130.

It should be understood that the grid data 120 is dynamic. In some implementations, the grid data 120 is updated as new satellite data 118 for a new constellation is added to the data storage device 116. In some implementations, a time period is associated with the grid data 120 identifying a length of time for which the stored grid data 120 is valid. Upon expiration of the time period, the stored grid data 120 is updated.

Figure 9A:
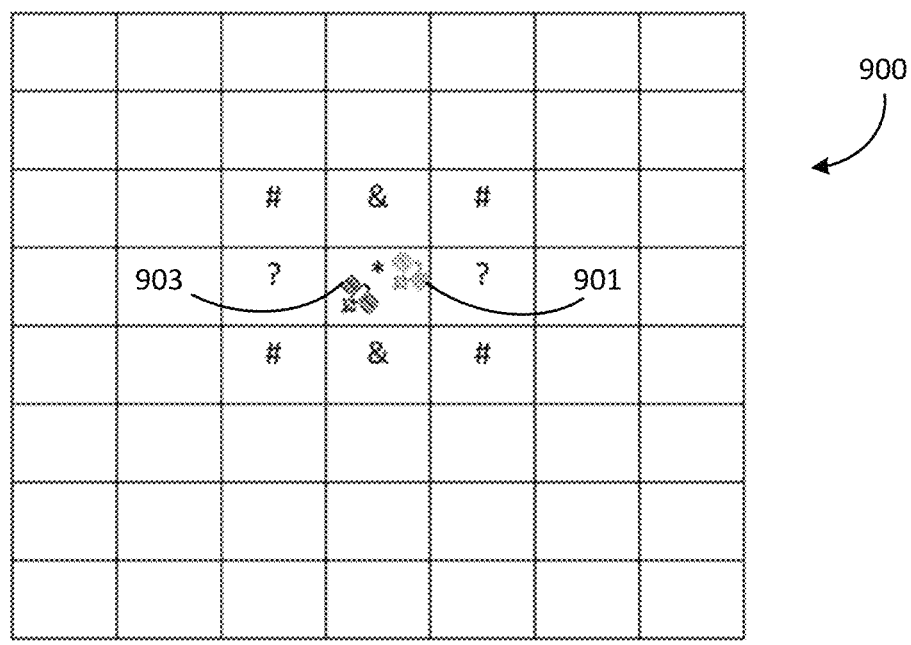
FIGS. 9A-9C illustrate examples of communication frequency allocation in a constellation on the micro-cell grid.
Figure 9B:
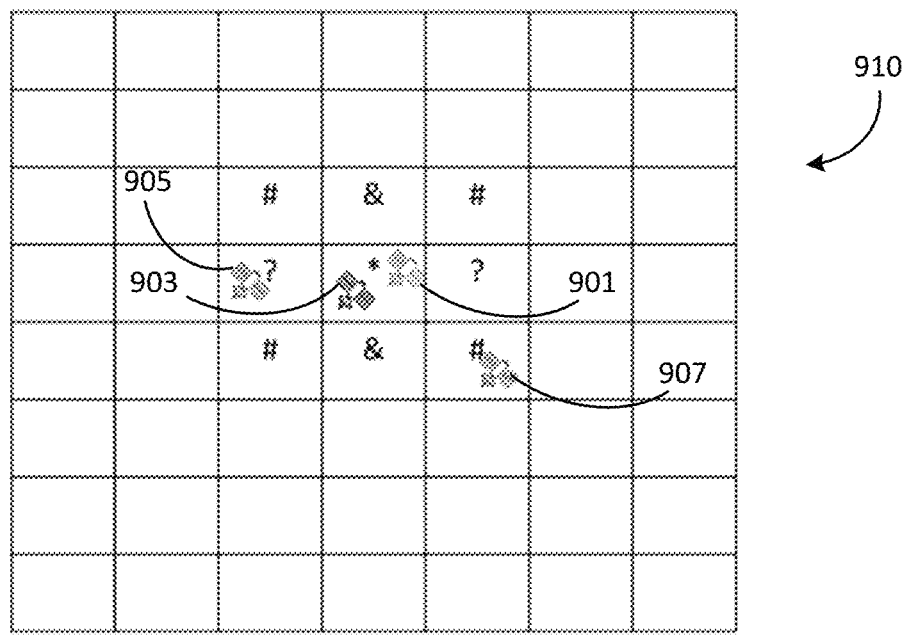
Figure 9C:
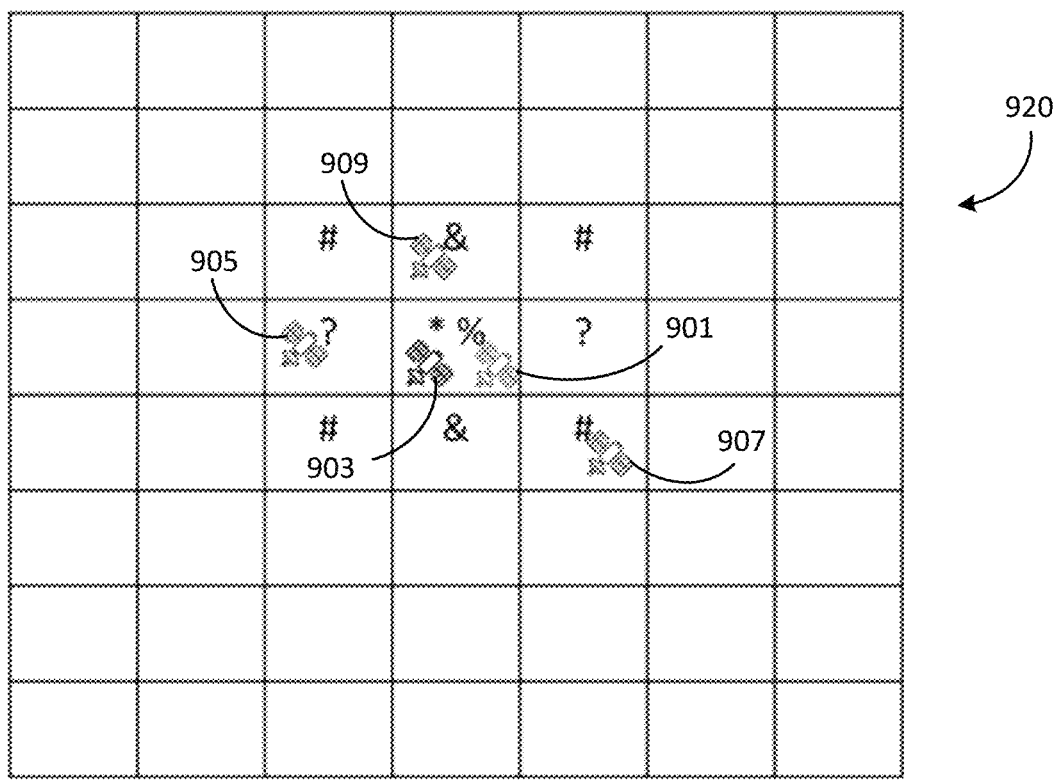

In some implementations, the grid data 120 includes a grid utilized by multiple, i.e., more than one, satellite constellations. In some implementations, the processor 108 may determine a cell in the grid data 120 that includes satellites from different constellations, for example as illustrated in FIGS. 9A-9C below. Thus, the processor 108 determines whether a neighboring cell in the grid has an available communication frequency, as described below in the description of FIG. 9B, or if a buffer communication frequency is required, as described below in the description of FIG. 9C.

Each of the first satellite 124 and the second satellite 126 may be a nanosatellite as described herein. For example, a constellation can include 100, 150, 200, or more iterations of the first satellite 124 and the second satellite 126. In some implementations, the first satellite 124 and the second satellite 126 utilize omnidirectional antennas. In other implementations, the first satellite 124 and the second satellite 126 utilize directional, beamforming antennas.

In some implementations, the ground device 128 is a ground station and/or ground sink for receiving data from the satellites over narrowband channels such as NB-IoT and LoRa network interfaces. Additionally, or alternatively, the ground device 128 can be further configured to send configuration data and/or other commands to the satellites via those same channels or different channels. Further, the ground device 128 is configured to send parameter data to the satellites, which is used by the satellites to enable the satellites to determine ground sinks to target when downlinking data to those ground sinks, as described herein. In contrast, ground sinks of the system are configured to only receive data from satellites over narrowband channels and to not send data to the satellites or otherwise perform uplink transmissions.

In some examples, the ground devices 128 are distributed across many different locations, and they are configured to be low-cost, enabling efficient establishment of a wide and varied network of ground stations and ground sinks. Further, in some examples, the ground devices 128 are provided in the form of existing cellular communication towers (cell towers) that are configured to receive and/or send data to satellites using NB-IoT communication. Such ground stations and/or sinks are configured to backhaul or otherwise send data to a destination using a network connection of the cell towers. Additionally, or alternatively, the system includes ground devices 128 that are separate devices mounted to cell towers and/or otherwise in communication with cell towers (e.g., via wireless communication such as NB-IoT communication). These ground devices 128 are configured to communicate with satellites using LoRa radio communications and to backhaul or otherwise send data to a destination by communicating the data to the attached cell towers (e.g., via a fiber cable connection) and/or the nearby cell towers (e.g., via wireless communication).

Additionally, or alternatively, ground devices 128 are configured to communicate with satellites using different interfaces and/or protocols. Further, ground devices 128 are configured to backhaul or otherwise send received data to cell towers or other network interfaces using other interfaces and/or protocols without departing from the description. For instance, in an example, a cell tower ground station is configured to communicate with the satellites using LoRa communication interfaces/protocols instead of NB-IoT interfaces/protocols. In other examples, other configurations are used without departing from the description. In some implementations, there are many ground devices 128 located around the world. Also, the ground device 128 may be a stationary device located in the northern or southern polar region of the world.

In some implementations, each of the ground IoT modems 130 is IoT device that communicates with one or more satellites. For example, the ground device 128 captures local information, such as humidity, temperature, or images, and transmits these to one or more satellites. Additionally, or alternatively, the IoT devices include other computing devices and/or components (e.g., the IoT modem is connected to an external computing device via Universal Serial Bus (USB) or Universal Asynchronous Receiver Transmitter (UART)). In some examples, the IoT devices further include microcontrollers, single-board computers, or the like, as well as peripheral components such as sensors that collect data at the location of the IoT device. For instance, an IoT device includes a sensor hub associated with a variety of sensors that collects and transmits sensor data to satellites of the system. Additionally, the IoT devices include other components, such as Global Positioning System (GPS) modules for geo-location.

In an example, an IoT device includes a transceiver SX126x or SX127x. The channel bandwidth of the IoT device is 7.8 kHz to 500 kHz excluding the Doppler frequency correction between 7 kHz and 20 kHz. The operation bandwidth is 150 MHz to 960 MHz including upper-VHF, UHF, and ISM (868 and 915). The central carrier frequency includes any frequency that is a multiple of 100 kHz in the above-mentioned range.

In some implementations, one or both of the first satellite 124 and the second satellite 126 communicates with the ground devices 128 and/or the ground IoT modems 130 by broadcasting a beacon. A beacon can be used to identify a communication frequency from the selected set for the ground device to communicate with the satellite while the satellite has a sub-satellite point in the one of the plurality of cells and to receive data from the ground station 128 or ground IoT modem 130.

In other implementations, such as with satellites having a non-dynamic orbit, a beacon is not used. Instead, the ground devices 128 and/or ground IoT modems 130 can predict when the first satellite 124 or the second satellite 126 is overhead, and use the frequency assigned to the cell in which the ground device 128 and/or ground IoT modem 130 is located.

Figure 2:
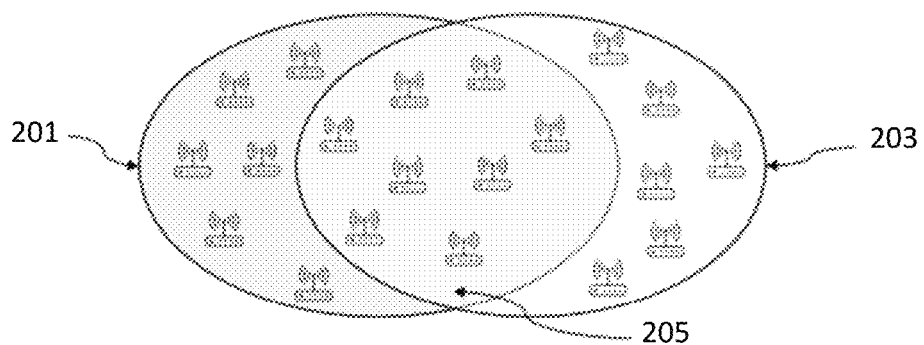
FIG. 2 is a diagram illustrating example ground Internet of Things (IoT) modems in overlapping satellite footprints.

FIG. 2 is a diagram illustrating ground IoT modems in overlapping satellite footprints. For example, FIG. 2 illustrates a first footprint 201 of a first satellite, for example the first satellite 124, and a second footprint 203 of a second satellite, for example the second satellite 126. Each of the footprints of the first satellite 124 and the second satellite 126 include a plurality of ground devices 128 and/or ground IoT modems 130 that can communicate with the first satellite 124 and the second satellite 126.

As described above, the footprints of satellites overlap as the number of satellites increase in a constellation, as illustrated by the overlapping area 205 of the footprints 201, 203 of the first satellite 124 and the second satellite 126, respectively. This results in a subset of the ground IoT modems 130 being in the footprint of both the first satellite 124 and the second satellite 126. When the footprints of the first satellite 124 and the second satellite 126 overlap, the ground IoT modems 130 create collision in the communication frequency of both satellites. In other words, as illustrated in FIG. 2, both the first satellite 124 and the second satellite 126 attempt to communicate with the ground IoT modems 130 using the same communication frequency, which creates collision.

Figure 3:
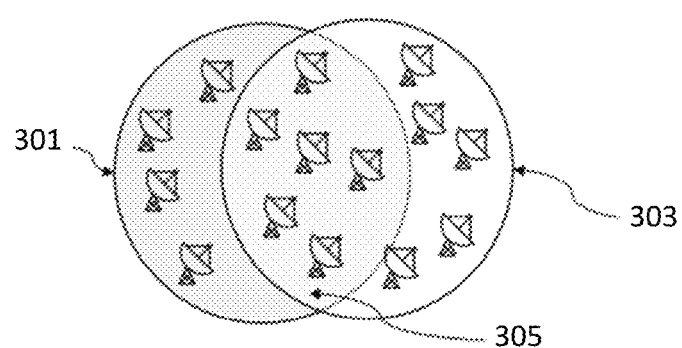
FIG. 3 is a diagram illustrating example ground receivers in overlapping footprints of satellites in different constellations.

FIG. 3 is a diagram illustrating ground receivers in overlapping footprints of satellites in different constellations. For example, FIG. 3 illustrates a first footprint 301 of a first satellite, for example the first satellite 124, from a first constellation and a second footprint 303 of a second satellite, for example the second satellite 126, from a second constellation. Each of the footprints 301, 303 of the first satellite 124 and the second satellite 126 encompass a plurality of ground receivers, for example multiple iterations of the ground device 128, that that can communicate with the first satellite 124 and second satellite 126. It should be understood that although illustrated in FIG. 3 as including satellites of different constellations, in a broadband satellite constellation the overlapping of footprints can also occur within the same constellation, for example as illustrated in FIG. 2.

FIG. 3 further illustrates an overlapping area 305 where the footprints 301, 303 of satellites overlap as the number of satellites increase in a constellation and when the number of constellations increase. The beamforming cannot avoid the overlapping of the footprints between satellites from different constellations because, as noted above, the bandwidth used for communication is narrow and the spectrum is crowded.

Like the overlapping satellite footprints illustrated in FIG. 2, the overlapping footprints 301, 303 operating on the same communication frequency illustrated in FIG. 3 can cause collisions. In some implementations, the challenges illustrated in FIG. 3 would be mitigated by spectrum sharing between the satellites providing the first footprint 301 and the satellites providing the second footprint 303, as described herein.

In some implementations, the sharing of communication frequency allocation occurs inter-constellation. In other words, the communication frequency or frequencies are shared by satellites in different constellations. In some implementations, different constellations are owned, organized, and operated by different organizations. For example, satellites in a first constellation can be owned by a first organization and satellites in a second constellation can be owned by a second organization, different than the first organization. Various implementations of the present disclosure recognize the advantages of sharing a spectrum rather than each organization using a different spectrum, due to limitations in the quantities of spectrums available.

In other implementations, the proposed sharing of communication frequency allocation occurs intra-constellation. In other words, the communication frequency or frequencies are shared by satellites in the same constellation. For example, different satellites within the same constellation, which are owned, organized, and operated by the same organization, share the allocated communication frequencies for communication with ground IoT modems. Accordingly, as described herein, implementations of the present disclosure provide systems and methods of spectrum sharing by providing a database that includes a mapped grid of communication frequencies within a spectrum to geographical cells for sharing of the spectrum among satellites and/or among constellations.

Figure 4:
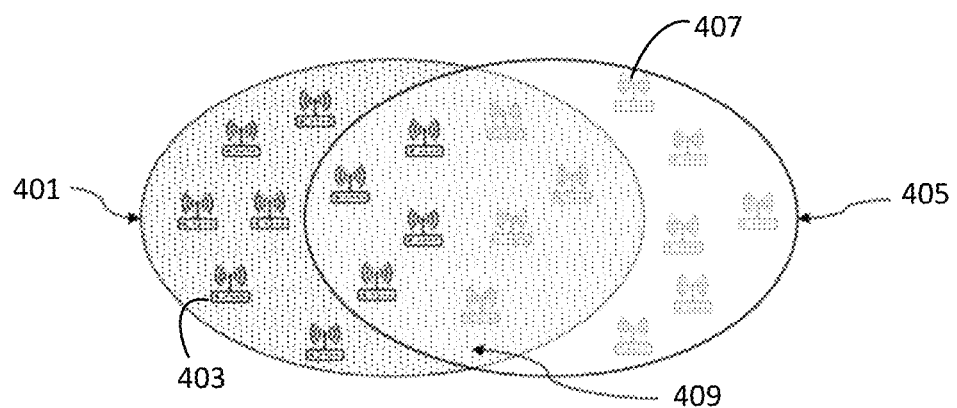
FIG. 4 is a diagram illustrating example location based communication frequency allocation for satellite and IoT modems/ground receivers.

FIG. 4 is a diagram illustrating location based communication frequency allocation. Various implementations of the location based communication frequency allocation can be provided without departing from the scope of the present disclosure. For example, additional elements can be added, various elements can be omitted, and so forth.

FIG. 4 illustrates a first footprint 401 of a first satellite, for example the first satellite 124, and a second footprint 405 of a second satellite, for example the second satellite 126. The first footprint 401 includes a plurality of first ground IoT modems 403 that communicate with the first satellite and the second footprint 405 includes a plurality of second ground IoT modems 407 that communicate with the second satellite. The ground IoT modems 130 utilize the communication frequency with a particular satellite based on the location of both the ground IoT modems 130 and the satellite. In some implementations, each of the ground IoT modems 407 is a separate ground IoT modem 130.

FIG. 4 also illustrates an overlapping area 409 of the first footprint 401 and the second footprint 405. The overlapping area 409 is a region of potential collision because some of the plurality of first ground IoT modems 403 and some of the plurality of second ground IoT modems 407 are located in both the first footprint 401 and the second footprint 405. As described in greater detail below, the first ground IoT modems 403 and the second ground IoT modems 407 within the overlapping area 409 are able to use either the communication frequency allocated to the cell where the overlapping area 409 is located or an additional, i.e., a buffer or reserve, communication frequency not explicitly allocated to the cell either the first satellite or the second satellite as described in greater detail below. Accordingly, collisions can be mitigated and/or avoided altogether.

Figure 5A:
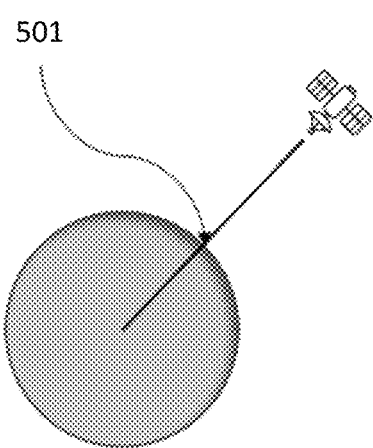
FIG. 5A is a diagram illustrating an example sub-satellite point.
Figure 5B:
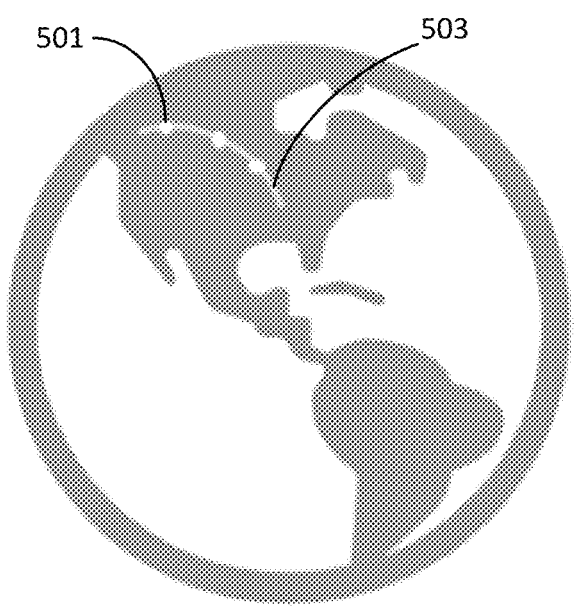
FIG. 5B is a diagram illustrating an example sub-satellite point and ground track.

FIG. 5A is a diagram illustrating a sub-satellite point and FIG. 5B is a diagram illustrating a sub-satellite point and ground track according to various implementations of the present disclosure. FIG. 5A illustrates a sub-satellite point 501 and FIG. 5B illustrates the ground track 503 and a sub-satellite point 501 along the ground track 503. A sub-satellite point 501 is a point where a virtual line between a satellite and the center of earth intersects the surface of the earth. For example, the sub-satellite point 501 can be the sub-satellite point 501 of either the first satellite 124 and/or the second satellite 126. The ground track 503 is the path followed by the satellite as it orbits the Earth. There are multiple sub-satellite points 501 along the ground track. For example, the ground track 503 can be the ground track 503 of either the first satellite 124 and/or the second satellite 126.

In some implementations, the sub-satellite points 501 and the ground tracks 503 of one or more satellites, such as the first satellite 124 and the second satellite 126, are stored in the data storage device 116 as satellite data 118. For example, the satellite data 118 can include sub-satellite points 501 and ground tracks 503 of one or more satellites in one or more constellations.

Figure 6A:
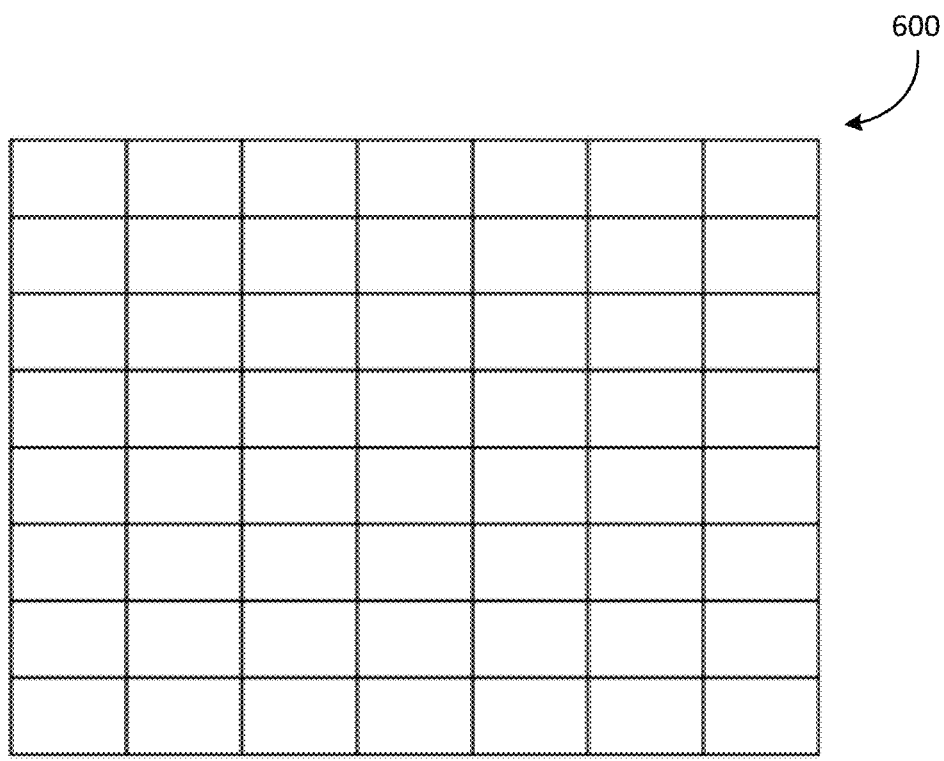
FIG. 6A illustrates an example micro-cell grid.
Figure 6B:
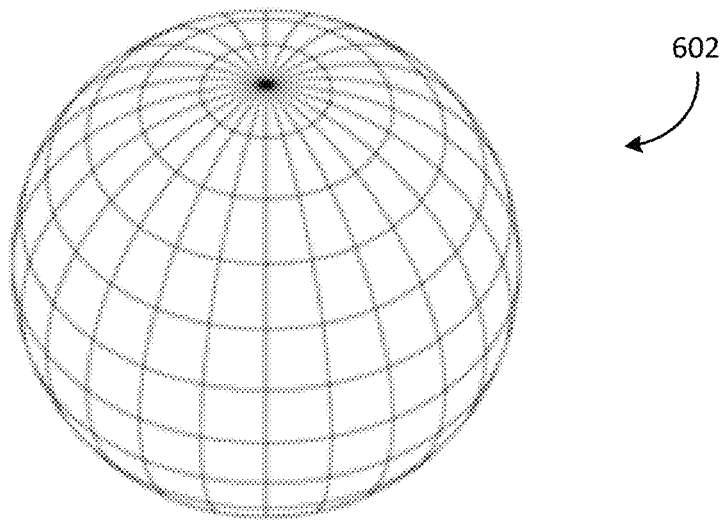
FIG. 6B illustrates an example micro-cell grid on a non-Euclidean plane.

FIG. 6A illustrates an example micro-cell grid according to various implementations of the present disclosure. The micro-cell grid 600 is a matrix where each cell includes a sub-satellite point 501 of a particular satellite in a constellation at a particular point in time or in a range of times. The size of each cell in the grid is set so that the sub-satellite points of two satellites in the same constellation will not fall in the same cell of the grid at the same time. The earth's surface is divided into one or more micro-cell grids 600, as illustrated in FIG. 6A. It should be understood that although the micro-cell grid 600 is illustrated in two dimensions (2D) for the ease of visualization, the micro-cell grid 600 is drawn on the surface of the earth, which is a non-Euclidean plane. Accordingly, FIG. 6B illustrates a micro-cell grid 602, which is an additional view of the micro-cell grid 600 along the surface of the earth according to various implementations of the present disclosure. In some implementations, the particular cells near the polar regions of the earth are triangular.

The size of each cell in the micro-cell grid 600 is defined such that no sub-satellite point 501 of two different satellites in a constellation are in the same cell at the same time (e.g., as determined based on the ground tracks of the satellites). In other words, the size of each cell depends on how the constellation within the micro-cell grid 600 is designed. In some implementations, the size of the cells depend on the particular organization, or service provider, of the constellation whose satellites are scheduled to pass over the particular micro-cell grid 600. Accordingly, the size of the cells within the micro-cell grid 600, and the size of the micro-cell grid 600 itself, is minimized to provide communication frequency allocation.

In some implementations, the sub-satellite points 501 are defined by coordinates that are used to generate a spectrum map that for a satellite includes selected communication frequencies for all cells which will include a sub-satellite point along the ground tracks 503 of the satellite. The coordinates include a specific latitude and a specific longitude for a specific point in time or ranges of points in time. For example, the sub-satellite point 501 of a particular satellite can include a latitude of 47°38' 13.52" N, a longitude of −122°07'25.45"W, and a time and date of 12:00:00 PM on Dec. 1, 2021, corresponding to when the sub-satellite point 501 is at the particular latitude and longitude.

In some implementations, the micro-cell grid 600 is stored in the data storage device 116 as the grid data 120. For example, the grid data 120 can include the micro-cell grid 600 for one or more constellations. As described in greater detail herein, the processor 108 accesses the satellite data 118 stored in the data storage device 116, which includes sub-satellite points 501 and ground tracks 503 of one or more satellites in one or more constellations, to allocate communication frequencies among the cells in the micro-cell grid 600. The computing device 102 then stores the allocated micro-cell grid 600 in the data storage device 116. In some implementations, the data storage device 116 is organized to store the satellite data 118 and the grid data 120 together. In other implementations, the satellite data 118 and the grid data 120 for all constellations are stored separately.

Figure 7A:
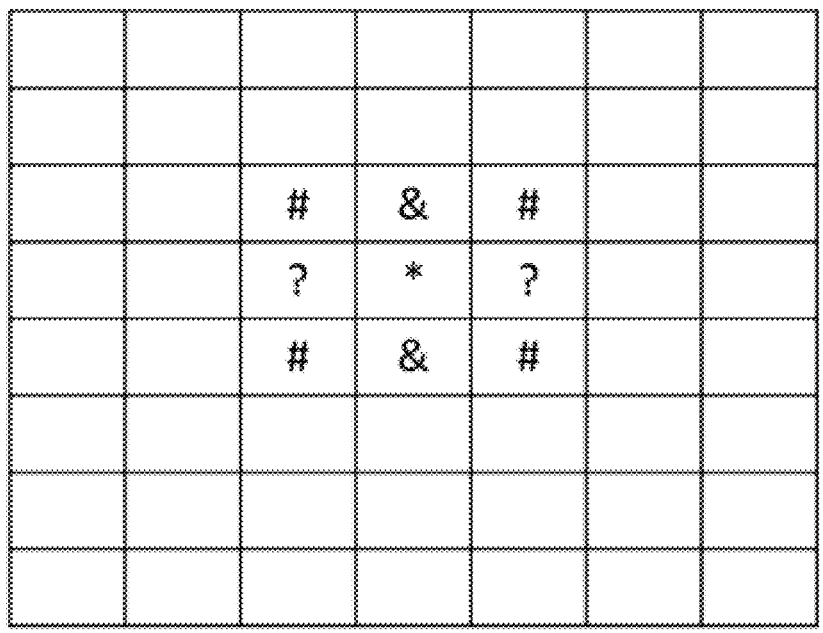
Figure 7B:
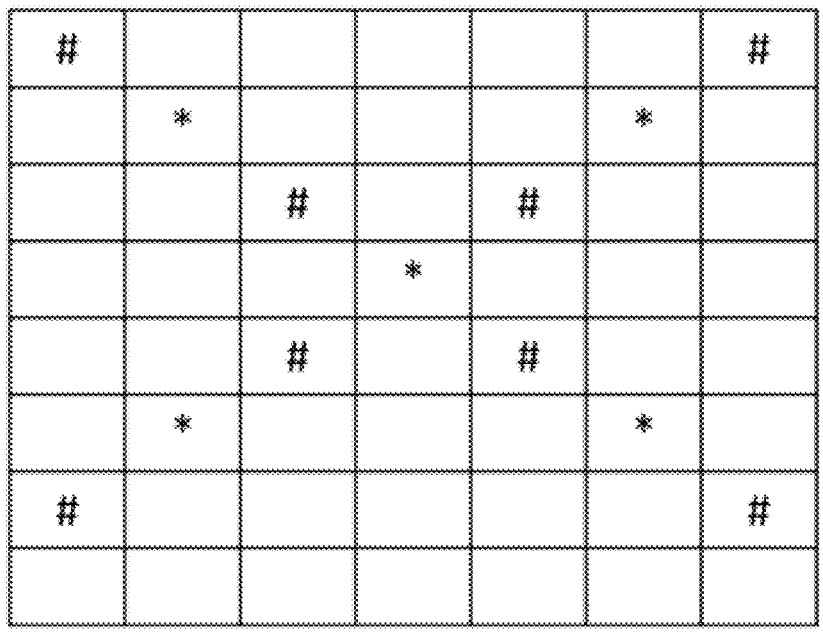
Figures 7C, 8:
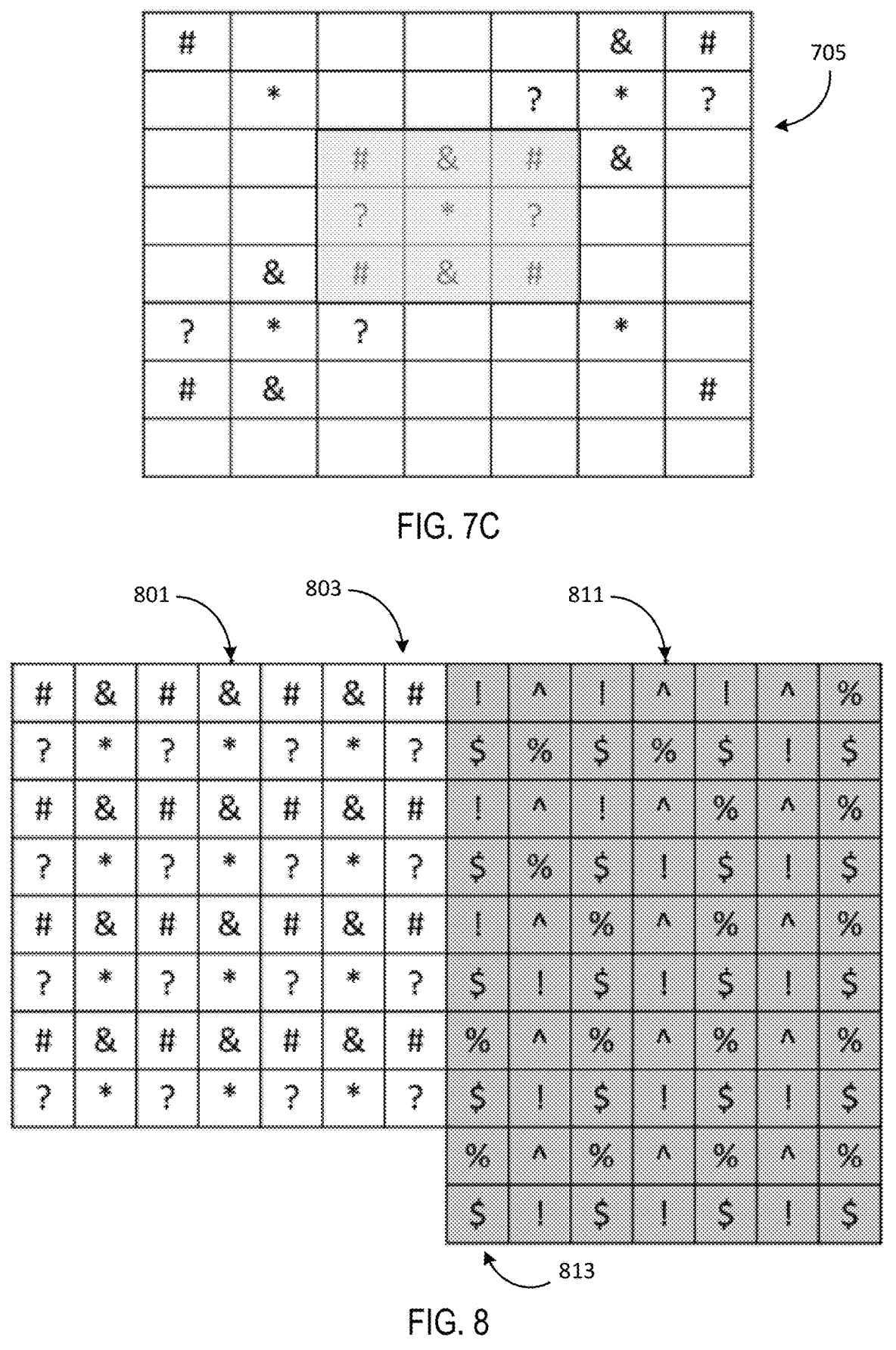

FIGS. 7A-7C illustrate examples of communication frequency allocation on the micro-cell grid according to various implementations of the present disclosure. Various implementations of the communication frequency allocation can be provided without departing from the scope of the present disclosure. For example, additional elements can be added, various elements can be omitted, and so forth.

FIGS. 7A-7C illustrate communication frequency allocation in the micro-cell grid 600, where it is assumed that the footprints of two satellites overlap if and only if their respective sub-satellite points are in neighboring cells. In FIGS. 7A-7C, the reference characters "*", "#", "&", and "?" each represent different communication frequencies. In some implementations, the communication frequencies are allocated by the processor 108 of the computing device 102.

For example, for ease of illustration and description, FIG. 7A illustrates communication frequency allocations for nine cells within a micro-cell grid 701. The micro-cell grid 701 can be an example of the micro-cell grid 600 described herein. In the micro-cell grid 701, each particular cell is assigned a communication frequency that is different from each communication frequency assigned to its neighboring cells. In other words, the communication frequency represented by "*" does not neighbor any other cells allocated the same communication frequency.

FIG. 7B illustrates diagonally orthogonal allocation of communication frequencies within a micro-cell grid 703. The micro-cell grid 703 can be an example of the micro-cell grid 600 and/or the micro-cell grid 701 described herein. By allocating the communication frequencies diagonally orthogonally, each cell in the micro-cell grid 703 is allocated or assigned a communication frequency that is different from each communication frequency assigned to its neighboring cells. Accordingly, the cells of the micro-cell grid 703 are allocated using four different communication frequencies, which minimizes unnecessary waste of additional communication frequencies and avoids overlap of communication frequencies to promote sharing of the spectrum as described herein. In the example illustrated in FIG. 7B, the communication frequency "*" and the communication frequency "#" are reused and allocated in a manner such that each cell allocated "*" is not neighboring any other cells allocated "*", and each cell allocated "#" is not neighboring any other cells allocated "#".

It should be understood that as used herein, the term diagonally orthogonal refers to diagonalization of the micro-cell grid 600 by an orthogonal change of coordinates. For example, FIG. 7C illustrates a micro-cell grid 705 that additionally incorporates additional communication frequencies, for example the "&" and "?" communication frequencies, in a diagonally orthogonal manner around the "*" and "#" communication frequencies allocated in the example provided in FIG. 7B. For example, the gray shaded area illustrated in FIG. 7C shows each of the "*", "#", "&", and "?" communication frequencies in a three-by-three square grid of the micro-cell grid 705, as illustrated in FIG. 7A, without any one cell having a neighboring cell that is assigned the same communication frequency as itself. For example, the communication frequencies in two neighboring cells are orthogonal to each other.

FIG. 8 illustrates an example of macro-cells according to various implementations of the present disclosure. Various implementations of the macro-cells can be provided without departing from the scope of the present disclosure. For example, additional elements can be added, various elements can be omitted, and so forth.

As referenced herein, a macro-cell is a collection of micro-cells, for example the micro-cell grids 600, 602, 701, 703, 705. As illustrated in FIG. 8, two macro cells use different sets of communication frequencies. For example, a first macro-cell 801 utilizes "*", "#", "&", and "?" communication frequencies, while a second macro-cell 811 utilizes "!", "^", "$", and "%" communication frequencies. As discussed above, it should be understood that the "*", "#", "&", "?", "!", "^", "$", and "%" communication frequencies are for illustration only and should not be construed as limiting. The characters "*", "#", "&", "?", "!", "^", "$", and "%" represent different communication frequencies that are allocated using the micro-cells and macro-cells described herein. In some implementations, the macro-cells 801, 811 are generated by the processor 108 and stored in the data storage device 116 as grid data 120.

In some implementations, the concept of macro-cells is used herein for a regulatory purpose, due to the same set of communication frequencies not being available worldwide, similar to television (TV) white spaces. For example, different countries, states, municipalities, and so forth throughout the world utilize different spectrums or different sets of communication frequencies within a spectrum. Different organizations, also referred to herein as service providers, may have different constellation sizes, constellation structures, different areas of coverage, different times of day for coverage, and so forth. For example, a particular organization may provide service in only part of the world. For example, the first macro-cell 801 is generated for a first country that utilizes "*", "#", "&", and "?" communication frequencies, while the second macro-cell 811 is generated for a second country that utilizes "!", "^", "$", and "%" communication frequencies. In another example, the first macro-cell 801 is generated for a first region that utilizes "*", "#", "&", and "?" communication frequencies, while the second macro-cell 811 is generated for a second region that utilizes "!", "^", "$", and "%" communication frequencies. In some implementations, the different sets of spectrums correspond to different frequencies (e.g., megahertz).

In some implementations, the macro-cells are provided in different sizes. For example, the grid of the first macro-cell 801 includes 64 cells, while the grid of the second macro-cell 811 includes 80 cells. These examples should not be construed as limiting. The grid of a macro-cell can contain fewer than 64 cells, between 64 and 80 cells, or more than 80 cells without departing from the scope of the present disclosure. In some implementations, the size of a particular macro-cell is based on the borders of the particular country, region, state, etc. the particular macro-cell corresponds to. For example, the border of the macro-cell 801, 811 is set, or locked in, so that the macro-cell fits within the corresponding border of the country, region, state, etc. In some implementations, the size of a macro-cell is set in accordance with guidelines from the regulatory authority in the locality to which the macro-cell corresponds.

In one example, the right-most column 803 of cells of the first macro-cell 801 borders the left-most column 813 of cell of the second macro-cell 811. In this example, the border between the column 803 and the column 813 is the border between countries, the border between regions, the border between states, and so forth.

FIGS. 9A-9C illustrate examples of communication frequency allocation on the micro-cell grid. Various implementations of the communication frequency allocation can be provided without departing from the scope of the present disclosure. For example, additional elements can be added, various elements can be omitted, and so forth.

As described herein, a micro-cell grid 600, 701, 703, 705 is generated that allocates communication frequencies to the different cells within the micro-cell grid and stored as grid data 120 in the data storage device 116. In this manner, the overlap in communication frequencies of the satellites of the constellation can be mitigated, or avoided altogether, to reduce collisions of communications from satellites to ground devices and/or ground IoT modems. However, it should be understood that in real-world applications, such as described above with reference to FIG. 3, the footprints of different constellations can overlap, resulting in a scenario where two satellites from different constellations end up in the same cell of the grid.

For example, FIG. 9A illustrates two satellites from different constellations in a single cell of a micro-cell grid 900. In some implementations, the micro-cell grid 900 is an example of the micro-cell grid 600, 602, 701, 703, or 705. The micro-cell grid 900 includes communication frequencies identified by "#", "?", "&", and "*". A first satellite 901 from a first constellation and a second satellite 903 from a second constellation are each located in the cell of the micro-cell grid 900 on the "*" communication frequency. The two satellites, the first satellite 901 and the second satellite 903, cannot use the communication frequency "*" allotted for the cell, otherwise collisions will occur. The present disclosure provides multiple solutions for allocating communication frequencies, some of which are next described as examples.

FIG. 9B illustrates a first solution for communication frequency allocation where satellites from different constellations are in the same cell as illustrated in FIG. 9A. For example, FIG. 9B illustrates a micro-cell grid 910 where the first satellite 901 and the second satellite 903 in the same cell operating in the "*" communication frequency, a third satellite 905 in an additional cell operating in the "?" communication frequency, and a fourth satellite 907 in an additional cell operating in the "#" communication frequency. As shown in FIG. 9B, neither of the two cells operating in the "&" cell and neighboring the cell operating in the "*" communication frequency are occupied by a satellite. In this example, each of the first satellite 901 and the second satellite 903 have two orthogonal communication frequencies, one of which is allocated for the cell and another which is allocated for the neighbor cells. Each of the first satellite 901 and the second satellite 903 are able to utilize a communication frequency orthogonal to another. In other words, one of the first satellite 901 or the second satellite 903 is able to utilize the "*" communication frequency, while the other utilizes the "&" communication frequency. For example, where the first satellite 901 utilizes the "*" communication frequency, the second satellite 903 utilizes the "&" communication frequency. In another example, where the second satellite 903 utilizes the "*" communication frequency, the first satellite 901 utilizes the "&" communication frequency.

FIG. 9C illustrates a second solution for communication frequency allocation where satellites from different constellations are in the same cell, for example as illustrated in FIG. 9A. In contrast to FIG. 9B, which illustrates a neighboring cell assigned a communication frequency that is not presently occupied by a satellite, FIG. 9C illustrates a micro-cell grid 920 where a cell assigned each of the neighboring orthogonal communication frequencies are occupied. For example, as illustrated in FIG. 9C, the first satellite 901 and the second satellite 903 in the same cell operating in the "*" communication frequency, the third satellite 905 in an additional cell operating in the "?" communication frequency, the fourth satellite 907 in an additional cell operating in the "#" communication frequency, and a fifth satellite 909 in an additional cell operating in the "&" communication frequency. Because each of the neighboring orthogonal cells are occupied, each of the first satellite 901 and the second satellite 903 are unable to utilize the "?" communication frequency, the "#" communication frequency, or the "&" communication frequency.

Instead, one of the first satellite 901 and the second satellite 903 utilizes the "*" communication frequency while the other utilizes a buffer, or reserve, communication frequency, such as the "%" communication frequency illustrated in FIG. 9C, that is orthogonal to each of the communication frequencies in the micro-cell grid 900. For example, the "%" communication frequency can be referred to as vertically orthogonal to each of the "*", "#", "&", and "?" communication frequencies. The buffer communication frequency is a communication frequency that is kept in reserve, or otherwise not typically made available for use, but is able to be used in scenarios where the cell sharing satellites are unable to use any of the neighboring orthogonal communication frequencies.

As described herein, the micro-cell grid, or grids, 600, 602, 701, 703, 705, 900, 910, 920 are stored in the data storage device 116 as grid data 120 and communicated to one or more ground devices 128 via the communications interface device 112 over the network 122. Each of the first satellite 901, the second satellite 903, the third satellite 905, the fourth satellite 907, and the fifth satellite 909 can be either of the first satellite 124 or the second satellite 126. Each of the satellites 901, 903, 905, 907, and 909 receives a spectrum map, including the grid data 120 corresponding to the ground tracks 503 of each respective satellite, from one or more of the ground devices 128. The grid data 120 is then used by each respective satellite to determine which communication frequency to use to communicate with ground IoT modems 130 as the satellite orbits the earth.

Some implementations of the present disclosure provide a centralized database, such as the data storage device 116, that stores the macro-cell grid and enables selection, for example via the processor 108, of the communication frequency to be used by each satellite for communication with ground IoT modems 130 as the satellite orbits the earth. In some implementations, the present disclosure provides an electronic device, such as the computing device 102, that generates one or more grids, allocates communication frequencies to the cells in each grid, generates a database and stores each grid in the database, and uses information extracted from the grids stored in the database to generate the spectrum map for each satellite that signals to the satellite which communication frequency to use to communicate with ground IoT modems 130 as the satellite orbits the earth. The computing device 102 transmits commands, via the communications interface device 112, to the ground device 128 including the spectrum map. The ground device 128 then transmits the spectrum map to the satellite.

Figure 10:
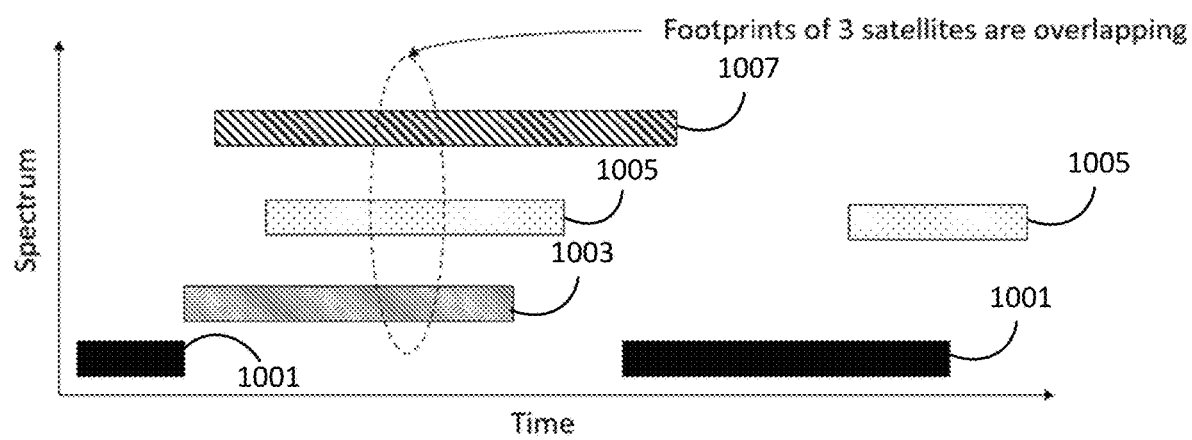
FIG. 10 illustrates an example of medium access control (MAC) of a ground IoT modem.

However, the ground IoT modem 130 is not in communication with the ground device 128 or the computing device 102 and therefore may not know which communication frequency will be used to communicate with a particular satellite at a particular point in time. For example, FIG. 10 illustrates an example of medium access control (MAC) of a ground IoT modem according to various implementations of the present disclosure. More particularly, FIG. 10 illustrates a graph showing different satellites with overlapping footprints over time. For example, four different satellites 1001, 1003, 1005, and 1007 are presented. The systems and methods herein propose a Spectrum/Satellite Time Division Multiple Access (STDMA)+ALOHA protocol as the MAC of ground IoT modems, rather than time division multiple access (TDMA), which is an asynchronous protocol. STDMA enables the selection of a suitable communication frequency, corresponding to a particular one of the satellites, by a ground IoT modem. For example, FIG. 10 illustrates the footprints of three satellites 1003, 1005, 1007 overlapping at a particular time.

In other words, the ground IoT modem 130 whose MAC is illustrated in FIG. 10 can recognize and receive beacons from three separate satellites, indicated by the footprints of the three satellites 1003, 1005, 1007 overlapping in FIG. 10, at a particular time. The ground IoT modem 130 can wait to receive a beacon from a satellite using one of the communication frequencies that overlap and then select that communication frequency to communicate with the satellite.

At any point in time, the list of available communication frequencies for a particular IoT modem depends on the satellite footprints covering its location. In some implementations, the selection of a communication frequency by the IoT modem is random. In other implementations, the selection of a communication frequency is based on the link budget that varies with elevation angle of the particular satellite. In some examples, a handover mechanism is not required as the payload size of an IoT application is very low. By implementing the MAC of the ground IoT modem, the IoT device is able to determine which frequency to utilize for communications.

It should be understood that although FIG. 10 is illustrated as the selected communication frequency being a function of time, the actual frame exchange is asynchronous. Communication frequency selection refers to selecting a satellite that the IoT modem intends to communicate with. Once the communication frequency is selected, the frames are transmitted following execution of an ALOHA protocol. Implementations presented herein utilize the STDMA wrapper on top of an existing MAC of a broadband ground receiver. In some implementations, a MAC layer cell or spectrum handover mechanism is introduced. The ground track of the satellite is predefined and known.

Figure 11:
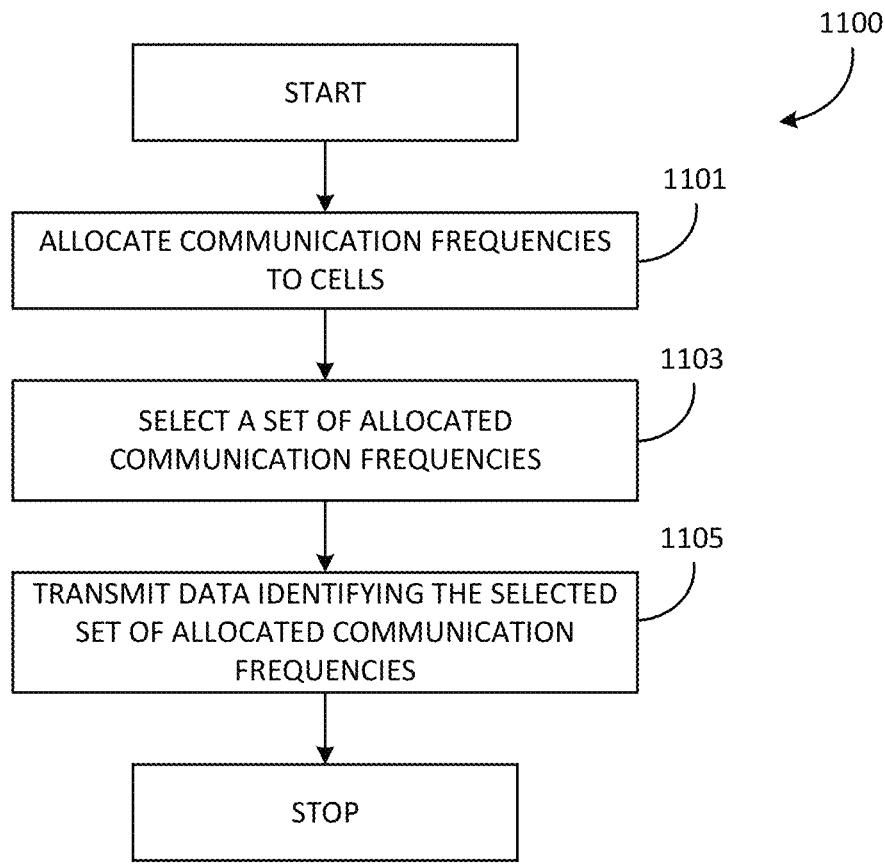
FIG. 11 is a flowchart illustrating a computerized method of managing a network of communication frequencies for IoT and broadband satellite constellations.

FIG. 11 is a flowchart illustrating a computerized method of managing a network of communication frequencies for IoT and broadband satellite constellations according to various implementations of the present disclosure. The operations illustrated in FIG. 11 are for illustration only and should not be construed as limiting. Other examples of the computerized method 1100 can be used without departing from the scope of the present disclosure. The operations of the computerized method 1100 can be executed by components of the system 100, such as the computing device 102, the first satellite 124, the second satellite 126, and the ground device 128.

The computerized method 1100 begins by allocating a plurality of communication frequencies to each of a plurality of cells in operation 1101. A communication frequency allocated to one cell of the plurality of cells is different from a communication frequency allocated to each cell neighboring the one cell. To allocate the plurality of communication frequencies, the processor 108 allocates a first communication frequency to a first cell of the plurality of cells and allocates a second communication frequency to a second cell of the plurality of cells, which is diagonally orthogonal to the first cell. The processor 108 then fills in the remaining cells by alternately allocating a third communication frequency to a third cell of the plurality of cells and a fourth communication frequency to a fourth cell of the plurality of cells in remaining diagonally orthogonal cells. In some implementations, the first communication frequency is assigned to a first organization, or service provider, the second communication frequency is assigned to a second organization, the third communication frequency is assigned to a third organization, and the fourth communication frequency is assigned to a fourth organization.

In some implementations, each of the plurality of communication frequencies is used for communication between a satellite and a ground device or a ground IoT modem. The satellite can be either of the first satellite 124 or the second satellite 126. The ground device can be one of the ground devices 128 and the ground IoT modem can be one of the ground IoT modems 130 described herein.

In operation 1103, the processor 108 selects a set of the allocated communication frequencies. In some implementations, to select the set of allocated communication frequencies, the processor 108 identifies a sub-satellite point of the satellite at a particular time and identifies the cell corresponding to the sub-satellite point. In some implementations, the processor 108 does not identify another satellite from another constellation in the cell at the particular time and selects the communication frequency assigned to the cell as the communication frequency to be used by the satellite to communicate with the ground IoT modem.

In other implementations, the processor 108 determines a second satellite allocated for the identified cell at the time. For example, the satellite can be included in a first constellation and the second satellite can be included in a second constellation. The processor 108 then determines whether a neighboring cell has an available communication frequency, for example a communication frequency that is not being used at the time by a satellite to communicate with a ground IoT modem. In implementations where an available communication frequency in a neighboring cell is identified, the processor 108 selects the available communication frequency for the communication. In implementations where the processor 108 determines the communication frequency of each neighboring cell is unavailable, the processor 108 selects a buffer, or reserve, communication frequency for the communication.

In operation 1105, the processor 108 transmits data identifying the selected set of the communication frequencies to the satellite. The satellite is configured to broadcast a beacon to a ground device in one of the plurality of cells identifying a communication frequency from the selected set for the ground device to communicate with the satellite while the satellite has a sub-satellite point in the one of the plurality of cells. In each contact window, the satellite sends a downlink transmission to the ground device 128 including various downlink data and receives an uplink transmission from the ground device 128 that includes commands to configure the satellite for the next communication window, such as the selected communication frequency, the time for the next communication window, etc.

In some implementations, a time period is associated with the allocated communication frequencies. The time period identifies a length of time for which the allocated communication frequencies is valid. In some implementations, the processor 108 updates the allocated communication frequencies upon expiration of the time period.

Additional Examples

In some implementations, a separate grid is generated for each satellite constellation. In other words, a first grid is generated for a first constellation, a second grid is generated for a second constellation, and so forth.

In some implementations, the computing device 102 further includes a machine learning component that generates the grid data 120. For example, the machine learning component generates the grid and allocates the communication frequencies to the cells of the grid, implementing the operations described herein.

Exemplary Operating Environment

Figure 12:
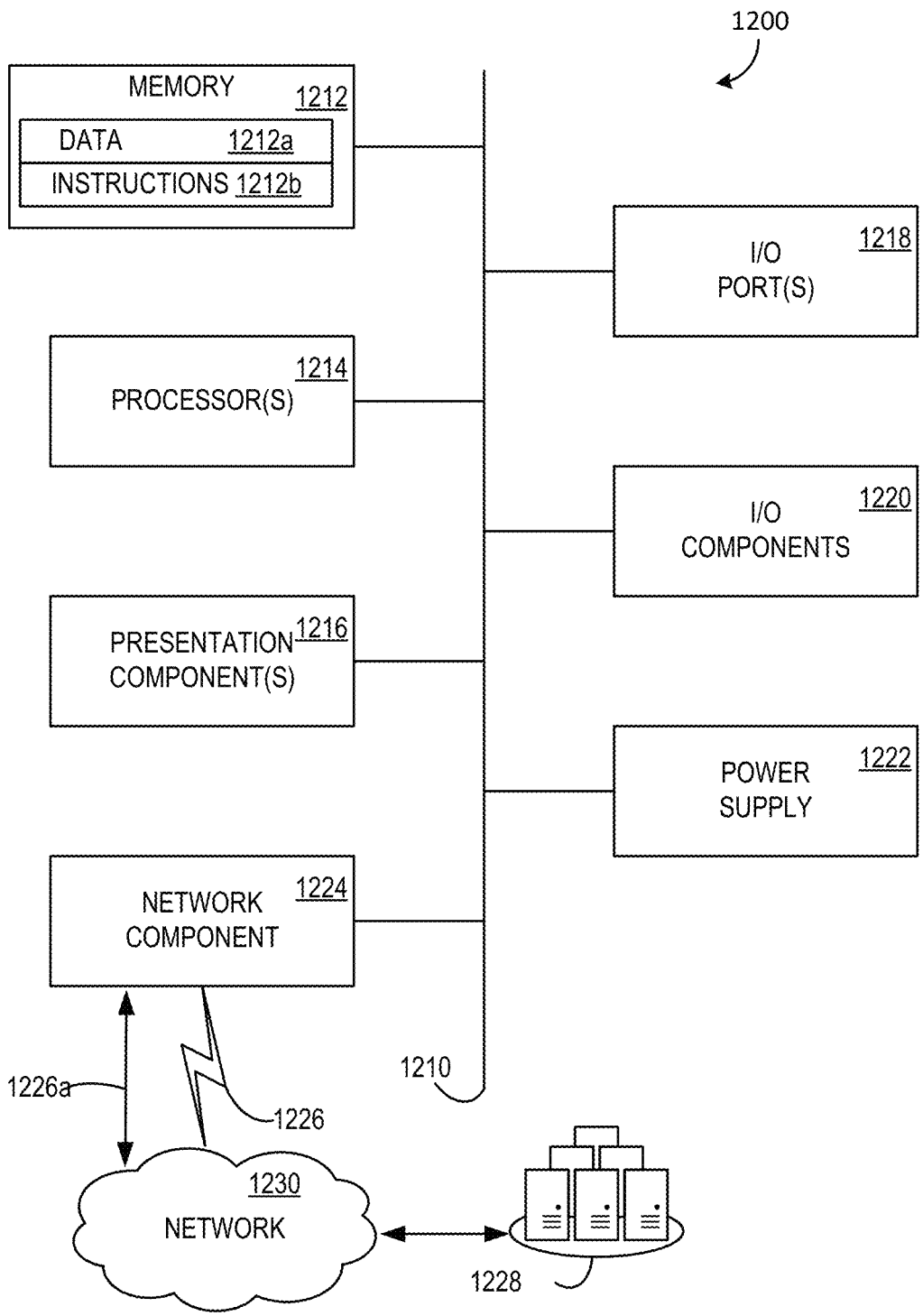
FIG. 12 is a block diagram illustrating an example computing device for implementing various examples of the present disclosure.

FIG. 12 is a block diagram illustrating an example computing device 1200 for implementing aspects disclosed herein and is designated generally as computing device 1200. Computing device 1200 is but one example of a suitable computing environment and is not intended to suggest any limitation as to the scope of use or functionality of the examples disclosed herein. Neither should the computing device 1200 be interpreted as having any dependency or requirement relating to any one or combination of components/modules illustrated.

The examples disclosed herein may be described in the general context of computer code or machine- or computer-executable instructions, such as program components, being executed by a computer or other machine. Program components include routines, programs, objects, components, data structures, and the like that refer to code, performs particular tasks, or implement particular abstract data types. The disclosed examples may be practiced in a variety of system configurations, including servers, personal computers, laptops, smart phones, servers, VMs, mobile tablets, hand-held devices, consumer electronics, specialty computing devices, head mounted devices (HMDs), etc. The disclosed examples may also be practiced in distributed computing environments when tasks are performed by remote-processing devices that are linked through a communications network.

The computing device 1200 includes a bus 1210 that directly or indirectly couples the following devices: computer-storage memory 1212, one or more processors 1214, one or more presentation components 1216, I/O ports 1218, I/O components 1220, a power supply 1222, and a network component 1224. While the computing device 1200 is depicted as a seemingly single device, multiple computing devices 1200 may work together and share the depicted device resources. For example, memory 1212 is distributed across multiple devices, and processor(s) 1214 is housed with different devices. Bus 1210 represents what may be one or more busses (such as an address bus, data bus, or a combination thereof). Although the various blocks of FIG. 12 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 12 and the references herein to a "computing device."

Memory 1212 may take the form of the computer-storage memory device referenced herein and operatively provide storage of computer-readable instructions, data structures, program modules and other data for the computing device 1200. In some examples, memory 1212 stores one or more of an operating system (OS), a universal application platform, or other program modules and program data. Memory 1212 is thus able to store and access data 1212a and instructions 1212b that are executable by processor 1214 and configured to carry out the various operations disclosed herein. In some examples, memory 1212 stores executable computer instructions for an OS and various software applications. The OS may be any OS designed to the control the functionality of the computing device 1200, including, for example but without limitation: WINDOWS® developed by the MICROSOFT CORPORATION®, MAC OS® developed by APPLE, INC.® of Cupertino, Calif., ANDROID™ developed by GOOGLE, INC.® of Mountain View, California, open-source LINUX®, and the like.

By way of example and not limitation, computer readable media comprise computer storage devices and communication media. Computer storage devices may include volatile, nonvolatile, removable, non-removable, or other memory implemented in any method or technology for storage of information such as computer-readable instructions, data structures, program modules, or the like. Computer storage devices are tangible and mutually exclusive to communication media. Computer storage devices are implemented in hardware and exclude carrier waves and propagated signals. Computer storage devices for purposes of this disclosure are not signals per se. Example computer storage devices include hard disks, flash drives, solid state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number an organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device, CPU, GPU, ASIC, system on chip (SoC), or the like for provisioning new VMs when configured to execute the instructions described herein.

Processor(s) 1214 may include any quantity of processing units that read data from various entities, such as memory 1212 or I/O components 1220. Specifically, processor(s) 1214 are programmed to execute computer-executable instructions for implementing aspects of the disclosure. The instructions may be performed by the processor 1214, by multiple processors 1214 within the computing device 1200, or by a processor external to the client computing device 1200. In some examples, the processor(s) 1214 are programmed to execute instructions such as those illustrated in the flow charts discussed herein and depicted in the accompanying figures. Moreover, in some examples, the processor(s) 1214 represent an implementation of analog techniques to perform the operations described herein. For example, the operations are performed by an analog client computing device 1200 and/or a digital client computing device 1200.

Presentation component(s) 1216 present data indications to a user or other device. Example presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1200, across a wired connection, or in other ways. I/O ports 1218 allow computing device 1200 to be logically coupled to other devices including I/O components 1220, some of which may be built in. Example I/O components 1220 include, for example but without limitation, a microphone, joystick, game pad, satellite dish, scanner, printer, wireless device, etc.

The computing device 1200 may communicate over a network 1230 via network component 1224 using logical connections to one or more remote computers. In some examples, the network component 1224 includes a network interface card and/or computer-executable instructions (e.g., a driver) for operating the network interface card. Communication between the computing device 1200 and other devices may occur using any protocol or mechanism over any wired or wireless connection. In some examples, network component 1224 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1224 communicates over wireless communication link 1226 and/or a wired communication link 1226a across network 1230 to a cloud environment 1228. Various different examples of communication links 1226 and 1226a include a wireless connection, a wired connection, and/or a dedicated link, and in some examples, at least a portion is routed through the Internet.

The network 1230 may include any computer network or combination thereof. Examples of computer networks configurable to operate as network 1230 include, without limitation, a wireless network; landline; cable line; digital subscriber line (DSL): fiber-optic line; cellular network (e.g., 3G, 4G, 5G, etc.); local area network (LAN); wide area network (WAN); metropolitan area network (MAN); or the like. The network 1230 is not limited, however, to connections coupling separate computer units. Rather, the network 1230 may also include subsystems that transfer data between servers or computing devices. For example, the network 1230 may also include a point-to-point connection, the Internet, an Ethernet, an electrical bus, a neural network, or other internal system. Such networking architectures are well known and need not be discussed at depth herein.

In some implementations, the memory 1212 is or includes a database, for example the data storage device 116 described in greater detail herein, that is accessed by a ground device, such as ground IoT modems and/or broadband receivers. For example, the processor 1214 generates a dynamic micro-cell grid, such as the micro-cell grid 700, that is used to manage the communication frequencies for one or more satellites in one or more constellations. In particular, the dynamic micro-cell grid is stored in the memory 1212 and communicated to one or more ground IoT modems and/or broadband receivers via the network component 1224 over the network 1230.

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example device for managing communication frequencies includes at least one processor, a transceiver, and a computer-readable medium storing instructions executable by the at least one processor. When the processor executes the instructions, the processor allocates one of a plurality of communication frequencies to each of a plurality of cells. A communication frequency allocated to one cell is different from a communication frequency allocated to each cell neighboring the one cell. The processor further selects, based on a ground track of a satellite, a set of the allocated communication frequencies and transmits data identifying the selected set of the communication frequencies to the satellite. The satellite is configured to broadcast a beacon, to a ground device in one of the plurality of cells, identifying a communication frequency from the selected set for the ground device to communicate with the satellite while the satellite has a sub-satellite point in the one of the plurality of cells.

An example computerized method for managing communication frequencies includes allocating one of a plurality of communication frequencies to each of a plurality of cells. A communication frequency allocated to one cell is different from a communication frequency allocated to each cell neighboring the one cell. The method further includes selecting, based on a ground track of a satellite, a set of the allocated communication frequencies and transmitting data identifying the selected set of the communication frequencies to the satellite. The satellite is configured to broadcast a beacon, to a ground device in one of the plurality of cells, identifying a communication frequency from the selected set for the ground device to communicate with the satellite while the satellite has a sub-satellite point in the one of the plurality of cells.

An example one or more computer-readable storage media includes a plurality of instructions for managing communication frequencies that, when executed by a processor, cause the processor to allocate one of a plurality of communication frequencies to each of a plurality of cells. A communication frequency allocated to one cell is different from a communication frequency allocated to each cell neighboring the one cell. The processor further selects, based on a ground track of a satellite, a set of the allocated communication frequencies and transmits data identifying the selected set of the communication frequencies to the satellite. The satellite is configured to broadcast a beacon, to a ground device in one of the plurality of cells, identifying a communication frequency from the selected set for the ground device to communicate with the satellite while the satellite has a sub-satellite point in the one of the plurality of cells Alternatively, or in addition to the other examples described herein, examples include any combination of the following:
  allocate a first communication frequency to a first cell of the plurality of cells,
  allocate a second communication frequency to a second cell of the plurality of cells, the second cell diagonally orthogonal to the first cell,
  alternately allocate a third communication frequency to a third cell of the plurality of cells and a fourth communication frequency to a fourth cell of the plurality of cells in remaining diagonally orthogonal cells;
  wherein the first communication frequency is assigned to a first organization and the second communication frequency is assigned to a second organization;
  wherein the database further includes a time period associated with the stored allocated grid, the time period identifying a length of time for which the stored allocated grid is valid;
  wherein the stored allocated grid is dynamic
  wherein the computer-readable medium further stores instructions that cause the processor to update the stored allocated grid upon expiration of the time period
  identify a sub-satellite point of the satellite at a time;
  identify the cell corresponding to the sub-satellite point;
  determine a second satellite allocated for the identified cell at the time;
  identify an available communication frequency in a neighboring cell;
  select the available communication frequency for the communication
  determine each neighboring cell is unavailable; and
  select a buffer communication frequency for the communication.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A device for managing communication frequencies for communication with a first satellite in a first constellation of satellites, the device comprising:
  a processor; and
  a computer storage medium storing instructions that, when executed by the processor, cause the processor to:
    allocate one of a plurality of communication frequencies to each of a plurality of cells, a communication frequency allocated to one cell being different from a communication frequency allocated to each cell neighboring the one cell such that only one satellite in the first constellation of satellites can have a sub-satellite point in any cell at a time, determine that a second satellite in a second constellation of satellites has a sub-satellite point in the same cell as the first satellite in the first constellation at the same time and is operating in the same communication frequency as the first satellite, determine that a neighboring cell to the same cell has an available communication frequency, select the communication frequency allocated to the neighboring cell for the first satellite in the first constellation, and transmit the selected communication frequency to the first satellite, wherein the first satellite is configured to communicate with a ground device located in one of the plurality of cells using the selected communication frequency.

2. The device of claim 1, the computer storage medium storing further instructions that, when executed by the processor, cause the processor to:

select a group of the allocated communication frequencies based on a plurality of sub-satellite points along a ground track of the first satellite; and transmit data identifying the selected group of the allocated communication frequencies to the first satellite, wherein the first satellite is configured to communicate with a ground device located in one of the plurality of cells using a communication frequency from the selected group, allocated to the one of the plurality of cells, while the first satellite has a sub-satellite point in the one of the plurality of cells.

3. The device of claim 2, wherein the sub-satellite point is represented by coordinates at a specific point in time or range of points in time.

4. The device of claim 2, wherein the plurality of cells comprises an irregularly shaped cell, and wherein boundaries of the plurality of cells are defined by geographical coordinates.

5. The device of claim 4, wherein only four different communication frequencies are allocated to the plurality of cells.

6. The device of claim 5, wherein, to select the group of the allocated communication frequencies, the computer storage medium further stores instructions that cause the processor to:

identify a sub-satellite point of the first satellite at a first time, and identify the cell corresponding to the sub-satellite point.

7. The device of claim 1, wherein the computer storage medium further stores instructions that cause the processor to:

determine that a third satellite of a third constellation of satellites has a sub-satellite point in the same cell as the first satellite in the first constellation at the same time, identify an available communication frequency for the second satellite in a neighboring cell, and select the available communication frequency for the second satellite for the cell.

8. The device of claim 7, where in the computer storage medium further stores instructions that cause the processor to:

determine that no neighboring cell has an available communication frequency, and select a buffer communication frequency for the first satellite for the cell.

9. A computer-implemented method for managing communication frequencies for communication with a first satellite in a first constellation of satellites, the method comprising:

allocating one of a plurality of communication frequencies to each of a plurality of cells, a communication frequency allocated to one cell being different from a communication frequency allocated to each cell neighboring the one cell such that only one satellite in the first constellation of satellites can have a sub-satellite point in any cell at a time;

identifying a plurality of sub-satellite points along a ground track of a satellite;

identifying cells of the plurality of cells corresponding to the plurality of sub-satellite points along the ground track of the satellite;

determining that a second satellite in a second constellation of satellites has a sub-satellite point in the same cell as the first satellite in the first constellation at the same time and is operating in the same communication frequency as the first satellite;

determining that a neighboring cell to the same cell has an available communication frequency;

selecting the communication frequency allocated to the neighboring cell for the first satellite in the first constellation; and transmitting the selected communication frequency to the first satellite, wherein the first satellite is configured to communicate with a ground device located in one of the plurality of cells using the selected communication frequency.

10. The computer-implemented method of claim 9, further comprising:

identifying a plurality of sub-satellite points along a ground track of the first satellite;

identifying cells of the plurality of cells corresponding to the plurality of sub-satellite points along the ground track of the first satellite;

selecting a group of the allocated communication frequencies based on the identified cells corresponding to the plurality of sub-satellite points along the ground track of the first satellite; and transmitting data identifying the selected group of the allocated communication frequencies to the first satellite, wherein the first satellite is configured to communicate with a ground device located in one of the plurality of cells using a communication frequency from the selected group, allocated to the one of the plurality of cells, while the first satellite has a sub-satellite point in the one of the plurality of cells.

11. The computer-implemented method of claim 10, wherein the sub-satellite point is represented by coordinates at a specific point in time or range of points in time.

12. The computer-implemented method of claim 10, wherein the plurality of cells comprises an irregularly shaped cell, and wherein boundaries of the plurality of cells are defined by geographical coordinates.

13. The computer-implemented method of claim 12, wherein only four different communication frequencies are allocated to the plurality of cells.

14. The computer-implemented method of claim 13, wherein selecting the group of the allocated communication frequencies comprises:

identifying a sub-satellite point of the first satellite at a time, and identifying the cell corresponding to the sub-satellite point.

15. The computer-implemented method of claim 14, further comprising:
determining an available communication frequency for the second satellite in a neighboring cell, and
selecting the available communication frequency for the second satellite for the cell.

16. The computer-implemented method of claim 9, further comprising:
determining that a third satellite of a third constellation of satellites has a sub-satellite point in the same cell as the first satellite in the first constellation at the same time;
determining each neighboring cell is unavailable; and
selecting a buffer communication frequency for the first satellite for the cell.

17. A non-transitory computer storage medium for comprising a plurality of instructions for managing communication frequencies for communication with a first satellite in a first constellation of satellites that, when executed by a processor, cause the processor to:
allocate one of a plurality of communication frequencies to each of a plurality of cells, a communication frequency allocated to one cell being different from a communication frequency allocated to each cell neighboring the one cell such that only one satellite in the first constellation of satellites can have a sub-satellite point in any cell at a time;
determine that a second satellite in a second constellation of satellites has a sub-satellite point in the same cell as the first satellite in the first constellation at the same time and is operating in the same communication frequency as the first satellite;
determine that a neighboring cell to the same cell has an available communication frequency;
select the communication frequency allocated to the neighboring cell for the first satellite in the first constellation; and
transmit the selected communication frequency to the first satellite, wherein the first satellite is configured to communicate with a ground device located in one of the plurality of cells using the selected communication frequency.

18. The non-transitory computer storage medium of claim 17, further comprising instructions that, when executed by the processor, cause the processor to:
select a group of the allocated communication frequencies based on a plurality of sub-satellite points along a ground track of the first satellite; and
transmit data identifying the selected group of the allocated communication frequencies to the first satellite, wherein the first satellite is configured to communicate with a ground device located in one of the plurality of cells using a communication frequency from the selected group, allocated to the one of the plurality of cells, while the first satellite has a sub-satellite point in the one of the plurality of cells.

19. The non-transitory computer storage medium of claim 18, further comprising instructions to select the group of the allocated communication frequencies that, when executed by the processor, cause the processor to:
identify a sub-satellite point of the first satellite at a time, and
identify the cell corresponding to the sub-satellite point.

20. The non-transitory computer storage medium of claim 17, further comprising instructions that, when executed by the processor, cause the processor to:
responsive to determining each neighboring cell is unavailable, select a buffer communication frequency for the first satellite for the cell.

* * * * *